United States Patent
Lambert et al.

(10) Patent No.: US 10,922,150 B2
(45) Date of Patent: Feb. 16, 2021

(54) DEEP HARDWARE ACCESS AND POLICY ENGINE

(71) Applicant: Dell Products L.P., Round Rock, TX (US)

(72) Inventors: Timothy M. Lambert, Austin, TX (US); Jeffrey Kennedy, Austin, TX (US)

(73) Assignee: Dell Products L.P., Round Rock, TX (US)

(*) Notice: Subject to any disclaimer, the term of this patent is extended or adjusted under 35 U.S.C. 154(b) by 117 days.

(21) Appl. No.: 15/803,277

(22) Filed: Nov. 3, 2017

(65) Prior Publication Data

US 2019/0138369 A1    May 9, 2019

(51) Int. Cl.
| | |
|---|---|
| *G06F 11/36* | (2006.01) |
| *G06F 9/54* | (2006.01) |
| *H04L 12/24* | (2006.01) |
| *G06F 11/07* | (2006.01) |
| *G06F 9/46* | (2006.01) |
| *H04W 12/08* | (2021.01) |

(52) U.S. Cl.
CPC ............ *G06F 9/542* (2013.01); *G06F 11/07* (2013.01); *G06F 11/3652* (2013.01); *G06F 11/3656* (2013.01); *H04L 41/0645* (2013.01); *H04L 41/0695* (2013.01); *H04L 41/0893* (2013.01); *G06F 9/468* (2013.01); *H04L 41/04* (2013.01); *H04W 12/08* (2013.01)

(58) Field of Classification Search
CPC ............ G06F 11/3652; G06F 11/3656; G06F 11/3648; G06F 11/07; G01R 31/31705
See application file for complete search history.

(56) References Cited

U.S. PATENT DOCUMENTS

| | | | |
|---|---|---|---|
| 2003/0140291 A1* | 7/2003 | Brown | G01R 31/318555 714/724 |
| 2008/0034239 A1* | 2/2008 | Lambert | G06F 1/14 713/323 |
| 2009/0217079 A1* | 8/2009 | Liu | G06F 9/4416 714/4.11 |
| 2016/0070486 A1* | 3/2016 | Anderson | G06F 13/4221 711/103 |
| 2016/0261455 A1* | 9/2016 | Su | H04L 41/069 |
| 2016/0294197 A1* | 10/2016 | Thompson | H02J 7/007 |
| 2017/0115350 A1* | 4/2017 | Zhang | G01R 31/31705 |
| 2017/0322867 A1* | 11/2017 | Jiao | G06F 11/3648 |

FOREIGN PATENT DOCUMENTS

WO    WO-2016004986 A1 *    1/2016    .......... G06F 11/0721

* cited by examiner

*Primary Examiner* — Yolanda L Wilson
(74) *Attorney, Agent, or Firm* — Jackson Walker L.L.P.

(57) ABSTRACT

In accordance with embodiments of the present disclosure, an information handling system may include a host system comprising at least one processor, a management controller communicatively coupled to the at least one processor and configured to provide out-of-band management of the information handling system, a debugging circuit, and a logic device coupled to the host system and to the management controller. The logic device may be configured to determine that a trigger event has taken place, and in response to the trigger event, provide a serial data stream corresponding to the trigger event to the debugging circuit. The debugging circuit may be configured to provide access to the serial data stream to a debugging information handling system via a wireless interface.

16 Claims, 2 Drawing Sheets

DEEP HARDWARE ACCESS AND POLICY ENGINE

TECHNICAL FIELD

The present disclosure relates in general to information handling systems. More particularly this disclosure relates to methods and systems for accessing information handling resources and systems, for example in a debugging context.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Even though many newer technologies are now available, serial ports (e.g., RS-232 ports using DB-9 connectors) remain a common and flexible method for establishing local bidirectional interaction from a debugging information handling system (e.g., a client system such as a laptop, phone, tablet, PDA etc.) to various subsystems of an information handling system (e.g., a server system). For example, information handling resources such as management controllers, machine control units (MCUs), programmable logic devices (PLDs) including complex programmable logic devices (CPLDs), field-programmable gate arrays (FPGAs) basic input/output systems (BIOSes), platform security processors, pre-boot environments, operating system (OSes), storage controllers, PCIe managers, etc. may be accessed in such a manner. Such access may be particularly advantageous for debugging problems that may arise with such information handling resources. Such access may further be useful during development, manufacturing, or at other times.

To partially mitigate the various drawbacks of using traditional serial ports, expensive onboard diagnostic LEDs and/or LCD displays are sometimes included in devices to diagnose lower-level undesired operation. Embodiments of this disclosure may provide access to low-level field service, manufacturing, and/or debugging capabilities without the need for such diagnostic LEDs or LCDs. According to various embodiments, mobile devices (e.g., phones, tablets, laptops, etc.) or other information handling systems may be able to access serial data streams without the need for a physical connection to a server serial port.

According to embodiments of this disclosure, the troubleshooting of software, hardware, BIOS, and/or firmware may be achieved in various stages of development, manufacturing, and/or field service. These troubleshooting functions may be utilized regardless of the operational state of a system through the use of a logic device providing enhanced status and control through a serialized data stream portal.

It should be noted that the discussion of any element as "background" or the like is not intended to create an admission of prior-art status as to that element. Unless clearly labeled as "prior art," nothing in this disclosure is intended to create such an admission.

SUMMARY

In accordance with the teachings of the present disclosure, many disadvantages and problems associated with providing debugging access to information handling resources may be reduced or eliminated.

In accordance with embodiments of the present disclosure, an information handling system may include a host system comprising at least one processor, a management controller communicatively coupled to the at least one processor and configured to provide out-of-band management of the information handling system, a debugging circuit, and a logic device coupled to the host system and to the management controller. The logic device may be configured to determine that a trigger event has taken place, and in response to the trigger event, provide a serial data stream corresponding to the trigger event to the debugging circuit. The debugging circuit may be configured to provide access to the serial data stream to a debugging information handling system via a wireless interface.

In accordance with these and other embodiments, a method may include receiving, at logic device of an information handling system, an indication that a trigger event has taken place. The method may further include, in response to the trigger event, the logic device providing a serial data stream corresponding to the trigger event to a debugging circuit of the information handling system. The method may yet further include the debugging circuit providing access to the serial data stream to a debugging information handling system via a wireless interface.

In accordance with these and other embodiments, a logic device may include circuitry configured to receive an indication that a trigger event has taken place within an information handling system. The logic device may further include circuitry configured to, in response to the trigger event, provide a serial data stream corresponding to the trigger event to a debugging circuit of the information handling system. The debugging circuit may be configured to provide access to the serial data stream to a debugging information handling system via a wireless interface.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
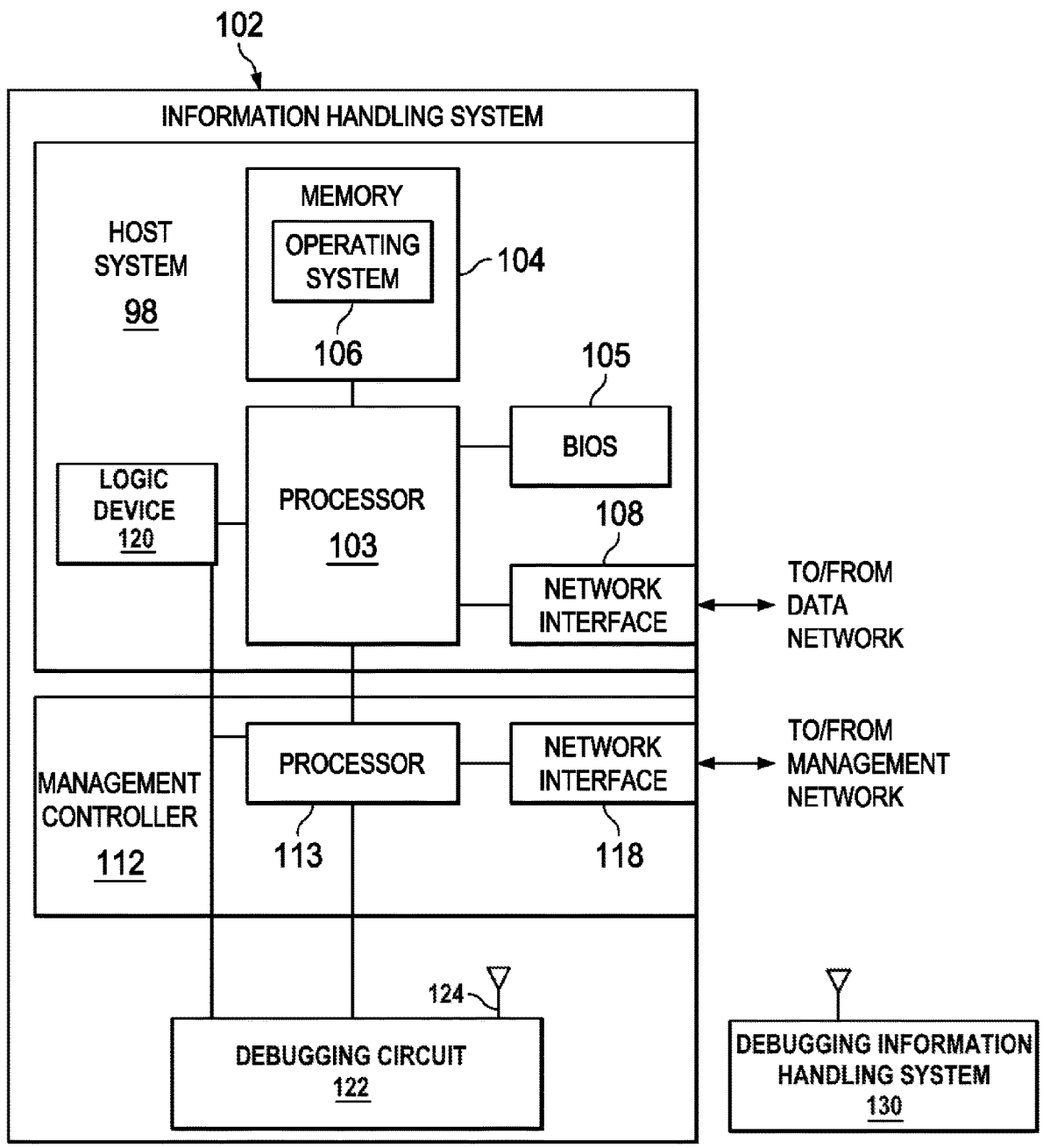
FIG. 1 illustrates a block diagram of an example information handling system, in accordance with embodiments of the present disclosure.
Figure 2:
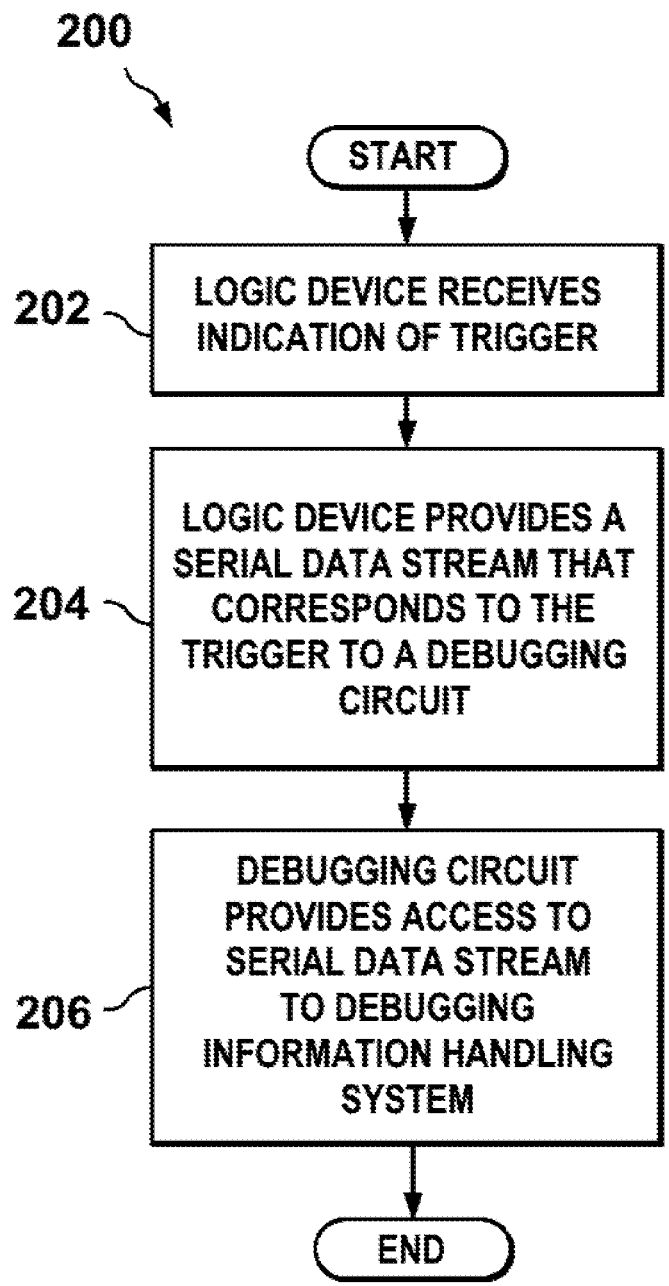
FIG. 2 illustrates a flow chart of an example method for providing debugging access, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media (e.g., transitory or non-transitory computer-readable media) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

As used herein, when two or more elements are referred to as "coupled" to one another, such term indicates that such two or more elements are in electronic communication or mechanical communication, as applicable, whether connected indirectly or directly, with or without intervening elements.

For the purposes of this disclosure, a serial port (and related terms such as serial connection, serial data stream, etc.) refers to a serial communications interface operable to transfer information one bit at a time. For example, an interface such as a COM port is an example of a serial port, as is any interface compliant with the RS-232 standard. Many serial ports include or are based on a universal asynchronous receiver-transmitter (UART) device. In some embodiments, terminal emulator programs may be used to interact with a serial data stream, with or without the use of a physical serial port.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example information handling system 102. In some embodiments, information handling system 102 may comprise a personal computer. In some embodiments, information handling system 102 may comprise or be an integral part of a server. In other embodiments, information handling system 102 may comprise a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, a BIOS 105 communicatively coupled to processor 103, a network interface 108 communicatively coupled to processor 103, and a management controller 112 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

A BIOS 105 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., disk drives) may be executed by processor 103 and given control of information handling system 102.

Network interface 108 may comprise any suitable system, apparatus, or device operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

In operation, processor 103, memory 104, BIOS 105, and network interface 108 may comprise at least a portion of a host system 98 of information handling system 102.

Management controller 112 may be configured to provide management facilities for management of information handling system 102. Such management may be made by management controller 112 even if information handling system 102 and/or host system 98 are powered off or powered to a standby state. Management controller 112 may include a processor 113, memory, and a management network interface 118 separate from and physically isolated from data network interface 108. In certain embodiments, management controller 112 may include or may be an integral part of a baseboard management controller (BMC), a chassis management controller (CMC), or a remote access controller (e.g., a Dell Remote Access Controller or Integrated Dell Remote Access Controller). As shown in FIG. 1, management controller 112 may comprise a processor 113 and a network interface 118 communicatively coupled to processor 113.

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in a memory and/or another component of information handling system 102 or management controller 112. As shown in FIG. 1, processor 113 may be communicatively coupled to processor 103. Such coupling may be via a Universal Serial Bus (USB), System Management Bus (SMBus), and/or one or more other communications channels.

Network interface 118 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC."

Host system 98 may further include logic device 120 and debugging circuit 122. Logic device 120 may be coupled to processor 103, processor 113, and debugging circuit 122, and may be a programmable logic device (PLD), a complex programmable logic device (CPLD), and/or a field-programmable gate array (FPGA) according to various embodiments. Logic device 120 may be used to achieve enhanced access to hardware states, BIOS or firmware operations, and/or software states within information handling system 102 regardless of system operational state. For example, as described in more detail below, logic device 120 may provide such access via a wired or wireless serial data stream exposed through debugging circuit 122. Various types of event handling, policies, and command-driven interactions may be securely achieved through logic device 120.

Logic device 120 may further include a UART (e.g., a 16550 UART) for communication of event information and/or serial data streams to debugging circuit 122, which may then communicate with a remote debugging information handling system 130.

Debugging circuit 122 may be implemented through the use of any of various types of circuitry in particular embodiments. For example, in some cases, debugging circuit 122 may be implemented as a CPLD device, an FPGA device, an ASIC, etc. Debugging circuit 122 may also include antenna 124 for communicating wirelessly (e.g., via Bluetooth, BLE, or any other desired wireless technology) with debugging information handling system 130. Debugging information handling system 130 (or some other information handling system usable for debugging) may also in some embodiments be coupled to debugging circuit 122 via a wired connection such as a USB connection.

Some examples of the types of data that may be accessible via logic device 120 and debugging circuit 122 include POST codes, status codes, error codes, ASCII descriptions of such codes, event time stamps, custom trigger events, logic device updates via serial data stream, device inventory, controls, and security information such as JTAG access, ROM protections, BIOS recovery, reset protection, etc. Further, I/O mapping of host system 98 and/or management controller 112 may be made available when it is requested or when changes occur. In some embodiments, data useable for failure prediction may also be available at logic device 120, such as boot-to-boot variation in various parameters that may be indicative of a future potential component failure. The availability of ASCII descriptions of events (e.g., human-readable strings of what failed instead of a 1-byte code that requires decoding) through logic device 120 may provide particular advantages in terms of cost savings and ease-of-use. For example, expensive dedicated debugging LEDs and/or LCDs may be omitted from information handling system 102, their functionality having been replaced by logic device 120.

In general, debugging information relevant to the operation of any information handling resources of information handling system 102 may be available at logic device 120 and exposed via debugging circuit 122. For example, due to its deep integration within information handling system 102, logic device 120 may facilitate debugging of low-level components such as the firmware or BIOS of information handling system 102, host system 98, or management controller 112, or any information handling resource thereof.

Debugging circuit 122 may receive, via logic device 120, serial data streams (e.g., unidirectional or bidirectional serial data streams) from any or all of the various information handling resources of information handling system 102 that are configured to communicate by serial data stream. For example, such serial data streams may include debugging information that may be useful if an information handling resource has partially or wholly malfunctioned.

In some embodiments, some or all of the serial data streams communicated to debugging circuit 122 may require authentication before being accessible to debugging information handling system 130. Thus, authentication data may be requested from debugging information handling system 130 before access to such serial data streams is granted. For example, management controller 112 may have one serial data stream (an unsecured stream) that does not require authenticated access, but another stream (a secured stream) that does require authenticated access. In some embodiments, authentication data may correspond to a user of debugging information handling system 130, and in other embodiments it may correspond to debugging information handling system 130 itself. For example, authentication data may include a username/password combination, a cryptographic key, etc. Authenticated serial data streams may provide access to particularly sensitive functionality, such as the ability to upload firmware updates via serial connection. Thus based on the authentication information, a particular subset of the available serial data streams (e.g., the streams to which the authenticated user has been granted access) may be provided.

Logic device 120 may further include therein (e.g., implemented partially or wholly in software, firmware, or hardware) a policy engine. In particular, the policy engine of logic device 120 may be configured to manage event detection and handling, policy determinations, information routing, and event interpretation through a plurality of rules. Such rules may be included within logic device 120 from its creation and/or may be programmed in later by a user. For example, custom event triggers may be predetermined and/or programmable. They may also be implemented as multi-tiered logical trigger events that may cause any desired action to take place as a result of any desired combination of events.

In some embodiments, policies may be set by management controller 112 and/or BIOS 105 such that logic device 120 may require authenticated serial access for user-commanded interaction, event-driven behaviors, etc. This may enable a certificate-based or login-based authentication for field service technicians to provide access to additional capabilities or particularly sensitive low-level access to information handling system 102. In these and other embodiments, the bidirectional communication between debugging information handling system 130 and logic device 120 may be used to send firmware updates to logic device 120 in a secure manner.

According to various embodiments, different levels of access may be provided to a remote user connected via logic device 120 and debugging circuit 122. Such a remote user may attempt various requests, such as (1) reading/writing specific register values (e.g., a field service technician dumping hardware failure states in determining what information handling resources to reseat or replace); (2) simulation of inventory changes, specific power rail faults, system reset events, etc.; and (3) creation of new debug triggers. The handling and servicing of such requests may be different based upon the particular access mode currently in force.

For example, a full-access embodiment may be advantageous during development or manufacturing, but may be less appropriate during field service. Such a full access mode may include advanced capabilities such as injecting simulated events, inventory manipulation faults, etc., or setting event triggers. This full-access embodiment may be particularly useful in the context of firmware and system engineering, manufacturing, and verification testing.

Alternatively, a full read-only mode may be in force. In such a mode, logic device 120 may output any type of information based on user read requests or events, but it may reject any write commands. This embodiment may be particularly useful in the context of field service, manufacturing, and developers/sustainers of hardware, firmware or BIOS.

Further, an event-output mode may be available. Such a mode may include outputting the codes or full text strings corresponding to a fault detection, a read or write from another interface, a state change (e.g., power, inventory, security policy, etc.), but may not allow arbitrary read or write accesses.

According to some embodiments, logic device 120 and/or debugging circuit 122 may be powered by an auxiliary power source of information handling system 102. Such an arrangement may advantageously allow logic device 120 and/or debugging circuit 122 to function even when other parts of information handling system 102 (e.g., host system 98 and/or management controller 112 and/or the main power rails) are wholly or partially non-functional.

In some embodiments, trigger events may cause logic device 120 and debugging circuit 122 to provide a particular data stream (e.g., to begin providing a serial data stream, or to switch from one serial data stream to another). As noted above, custom trigger events may be configured in any desired manner, but some examples may include triggers based on the failure of main power, failure of auxiliary power, secure boot failure, timeouts associated with management controller 112, and/or other anomalous events.

In some embodiments, debugging circuit 122 may be configured to automatically begin transmitting a particular serial data stream in response to such a trigger event. For example, in response to a detection of a power fault, a low-level debugging serial data stream (e.g., from a power supply unit or from management controller 112) may be automatically initiated, even in the absence of a request from debugging information handling system 130. In particular, even if debugging information handling system 130 is not currently connected, such a data stream may be triggered and begin flowing repetitively in case a technician begins listening.

Further, in some embodiments, a debugging information handling system 130 may access serial data streams via a wired connection such as a UART-USB bridge, which may be located on a front portion of information handling system 102.

In addition to the elements shown, information handling system 102 may include one or more other information handling resources. Further, although FIG. 1 depicts information handling system 102 as only having a single host system 98 for the purposes of clarity and exposition, in some embodiments, information handling system 102 may comprise a server rack including a plurality of racks of host systems 98. In such embodiments, information handling resources from a plurality of such racks of host systems 98 may all be communicated to debugging circuit 122 in the manners described above, as will be readily understood by one of ordinary skill in the art with the benefit of this disclosure.

Turning now to FIG. 2, a flow chart of an example method 200 for providing debugging information from elements of an information handling system is shown, in accordance with certain embodiments of the present disclosure.

According to some embodiments, method 200 may begin at step 202. As noted above, teachings of the present disclosure may be implemented in a variety of configurations of information handling system 102.

At step 202, a logic device receives an indication of a trigger event. Various possibilities for the source and/or nature of such a trigger event are discussed above. One of ordinary skill in the art with the benefit of this disclosure will recognize other possibilities that are also within the scope of this disclosure.

At step 204, the logic device provides a serial data stream that corresponds to the trigger event to a debugging circuit. For example, if the trigger event relates to a malfunction in a management controller, the logic device may provide a management controller serial data stream to the debugging circuit. In general, the logic device may select a serial data stream that is appropriate to the circumstances.

At step 206, the debugging circuit provides access to that serial data stream to a debugging information handling system. As discussed above, the connection to the debugging information handling system may be wired or wireless in various embodiments. Method 200 ends after step 206.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
  a host system comprising at least one processor;
  a management controller communicatively coupled to the at least one processor and configured to provide out-of-band management of the information handling system;
  a debugging circuit; and
  a logic device coupled to the host system and to the management controller, wherein the logic device is configured to:
    determine that a trigger event has taken place, wherein the trigger event comprises a boot failure of the management controller caused by a failure of a power supply of the information handling system; and
    in response to the trigger event, provide a serial data stream corresponding to the trigger event to the debugging circuit, wherein the serial data stream includes debugging data from the power supply;
  wherein the debugging circuit is configured to send the serial data stream to a debugging information handling system via a wireless interface without a request from the debugging information handling system, wherein the serial data stream is automatically transmitted repeatedly.

2. The information handling system of claim 1, wherein the logic device is further configured to detect a second type of trigger event that is a fault condition of the information handling system.

3. The information handling system of claim 1, wherein the logic device is a complex programmable logic device (CPLD).

4. The information handling system of claim 1, wherein the logic device is a field-programmable gate array (FPGA).

5. The information handling system of claim 1, wherein the information handling system includes a plurality of host systems.

6. The information handling system of claim 1, wherein the wireless interface is a Bluetooth interface.

7. The information handling system of claim 1, wherein the logic device is coupled to the debugging circuit via a universal asynchronous receiver-transmitter (UART).

8. The information handling system of claim 1, wherein the information handling system does not include a dedicated debugging LED or a dedicated debugging LCD.

9. A method comprising:
  receiving, at logic device of an information handling system, an indication that a trigger event has taken place, wherein the trigger event comprises a boot failure of a management controller of the information handling system caused by a failure of a power supply of the information handling system;
  in response to the trigger event, the logic device providing a serial data stream corresponding to the trigger event to a debugging circuit of the information handling system, wherein the serial data stream includes debugging data from the power supply; and
  the debugging circuit sending the serial data stream to a debugging information handling system via a wireless interface without a request from the debugging information handling system, wherein the serial data stream is automatically transmitted repeatedly.

10. The method of claim 9, wherein the management controller of the information handling system is configured to provide out-of-band management of the information handling system.

11. The method of claim 9, further comprising:
requesting authentication information from the debugging information handling system; and
providing the access in response to receiving the authentication information.

12. A logic device comprising:
circuitry configured to receive an indication that a trigger event has taken place within an information handling system, wherein the trigger event comprises a boot failure of a management controller of the information handling system caused by a failure of a power supply of the information handling system; and
circuitry configured to, in response to the trigger event, provide a serial data stream corresponding to the trigger event to a debugging circuit of the information handling system, wherein the serial data stream includes debugging data from the power supply;
wherein the debugging circuit is configured to send the serial data stream to a debugging information handling system via a wireless interface without a request from the debugging information handling system, wherein the serial data stream is automatically transmitted repeatedly.

13. The logic device of claim 12, wherein the wireless interface includes an interface selected from the group consisting of Bluetooth and Bluetooth Low Energy (BLE).

14. The logic device of claim 12, wherein the circuitry is further configured to detect a second type of trigger event that corresponds to a fault condition in an information handling resource of the information handling system.

15. The logic device of claim 12, further comprising a wired interface configured to provide the access.

16. The logic device of claim 15, wherein the wired interface is a Universal Serial Bus (USB) interface.

* * * * *